US011184215B2

(12) United States Patent
Mushikabe et al.

(10) Patent No.: US 11,184,215 B2
(45) Date of Patent: Nov. 23, 2021

(54) CONTROL DEVICE, CONTROL TARGET DEVICE, AND PROCESSING METHOD FOR DISPLAY DATA

(71) Applicant: Yamaha Corporation, Hamamatsu (JP)

(72) Inventors: Kazuya Mushikabe, Hamamatsu (JP); Akihiko Suyama, Hamamatsu (JP); Keisuke Tsukada, Hamamatsu (JP); Katsuaki Tanaka, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 66 days.

(21) Appl. No.: 16/361,705

(22) Filed: Mar. 22, 2019

(65) Prior Publication Data

US 2019/0220382 A1 Jul. 18, 2019

Related U.S. Application Data

(63) Continuation of application No. PCT/JP2016/078053, filed on Sep. 23, 2016.

(51) Int. Cl.
*G06F 9/445* (2018.01)
*H04L 29/06* (2006.01)
(Continued)

(52) U.S. Cl.
CPC .......... *H04L 29/06027* (2013.01); *G06F 8/65* (2013.01); *G06F 9/454* (2018.02);
(Continued)

(58) Field of Classification Search
CPC .. G06Q 20/3829; G06Q 30/02; G06Q 10/087; G06Q 20/3223; G06Q 30/0623;
(Continued)

(56) References Cited

U.S. PATENT DOCUMENTS

2011/0078054 A1 3/2011 Saito et al.
2011/0205584 A1 8/2011 Ito
(Continued)

FOREIGN PATENT DOCUMENTS

JP 2009-200861 A 9/2009
JP 2011-175480 A 9/2011
(Continued)

OTHER PUBLICATIONS

Japanese-language Office Action issued in counterpart Japanese Application No. 2018-540568 dated Aug. 6, 2019 with English translation (seven pages).
(Continued)

*Primary Examiner* — Tuan A Vu
(74) *Attorney, Agent, or Firm* — Crowell & Moring LLP

(57) ABSTRACT

A control device includes a communication device configured to receive, from a control target device connected to the control device through a network, configuration information on a configuration of software and/or hardware of the control target device, a controller configured to acquire a display article from a server device connected to the control device through the network, and determine whether to store the display article in a storage as display data, based on the configuration information, and the storage configured to store the display data based on the determination by the controller.

20 Claims, 22 Drawing Sheets

(51) Int. Cl.

| | |
|---|---|
| ***G06F 11/32*** | (2006.01) |
| ***G06F 16/9035*** | (2019.01) |
| ***G06F 16/18*** | (2019.01) |
| ***G06F 8/65*** | (2018.01) |
| ***G06F 9/451*** | (2018.01) |
| ***G06F 13/00*** | (2006.01) |
| ***H04L 12/26*** | (2006.01) |
| *G06Q 20/32* | (2012.01) |
| *G06Q 10/08* | (2012.01) |
| *G06Q 30/06* | (2012.01) |
| *G06Q 30/02* | (2012.01) |

(52) U.S. Cl.

CPC .............. *G06F 11/32* (2013.01); *G06F 13/00* (2013.01); *G06F 16/1873* (2019.01); *G06F 16/9035* (2019.01); *H04L 43/04* (2013.01); *G06Q 10/087* (2013.01); *G06Q 20/3223* (2013.01); *G06Q 30/02* (2013.01); *G06Q 30/0623* (2013.01)

(58) Field of Classification Search

CPC . H04L 67/025; H04L 43/04; H04L 29/06027; G06F 40/169; G06F 16/9566; H04W 12/003; H04N 21/26291; G16H 20/60

See application file for complete search history.

(56) References Cited

U.S. PATENT DOCUMENTS

| | | | | |
|---|---|---|---|---|
| 2011/0320293 | A1* | 12/2011 | Khan | G06Q 20/3223 705/16 |
| 2012/0005026 | A1* | 1/2012 | Khan | G06Q 30/02 705/14.64 |
| 2013/0124186 | A1* | 5/2013 | Donabedian | H04L 67/025 704/2 |
| 2013/0247117 | A1* | 9/2013 | Yamada | H04W 12/003 725/93 |
| 2014/0282686 | A1* | 9/2014 | Silverman | H04N 21/26291 725/31 |
| 2014/0344420 | A1* | 11/2014 | Rjeili | H04L 43/04 709/220 |
| 2014/0365205 | A1 | 12/2014 | Nishina | |
| 2014/0374474 | A1* | 12/2014 | Huang | G06Q 30/0623 235/375 |
| 2015/0073879 | A1* | 3/2015 | Acosta-Cazaubon | G06F 16/9566 705/12 |
| 2015/0178290 | A1 | 6/2015 | Hirooka | |
| 2016/0027022 | A1* | 1/2016 | Benoit | G06Q 10/087 235/385 |
| 2016/0203352 | A1* | 7/2016 | Marsico | G16H 20/60 235/375 |
| 2017/0148018 | A1* | 5/2017 | Levin | G06Q 20/3829 |
| 2018/0061274 | A1* | 3/2018 | Frahling | G06F 40/169 |

FOREIGN PATENT DOCUMENTS

| | | | |
|---|---|---|---|
| JP | 2013-65206 | A | 4/2013 |
| JP | 2014-238679 | A | 12/2014 |
| JP | 2014-241526 | A | 12/2014 |
| JP | 2015-125508 | A | 7/2015 |
| WO | WO 2010/007842 | A1 | 1/2010 |
| WO | WO 2010/143223 | A1 | 12/2010 |

OTHER PUBLICATIONS

International Preliminary Report on Patentability (PCT/IB/338 & PCT/IB/373) issued in PCT Application No. PCT/JP2016/078053 dated Apr. 4, 2019, including English translation of document (Japanese-language Written Opinion (PCT/ISA/237) previously filed on Mar. 22, 2019) (eight (8) pages).

International Search Report (PCT/ISA/210) issued in PCT Application No. PCT/JP2016/078053 dated Dec. 13, 2016 with English translation (four (4) pages).

Japanese-language Written Opinion (PCT/ISA/237) issued in PCT Application No. PCT/JP2016/078053 dated Dec. 13, 2016 (four (4) pages).

Japanese-language Office Action issued in Japanese Application No. 2018-540568 dated Feb. 18, 2020 with English translation (five pages).

* cited by examiner

FIG.4 update.json (FIRST FILE)

| | |
|---|---|
| id | update |
| updated_at | 20160601 |
| url | http://sample.com/id20160601.json |

FIG.5 id20160601.json (SECOND FILE)

| | | | |
|---|---|---|---|
| id | | | id20160601 |
| updated_at | | | 20160601 |
| previous_url | | | http://sample.com/update.json |
| next_url | | | http://sample.com/id20160501.json |
| articles | | | |
| | created_at | | 20160601 |
| | model names | | All |
| | region | | All |
| | tag | | App |
| | langs | | |
| | | lang | en |
| | | title | Version 1.20 |
| | | message | New functions are available. |
| | | lang | jp |
| | | title | バージョン 1.20 |
| | | message | 新しい機能が追加されました |
| | | lang | de |
| | | title | Version 1.20 |
| | | message | Neue Funktionen zur Verfügung. |
| | | … | |
| | created_at | | 20160520 |
| | model names | | AVR-XXXX |
| | region | | us, jp, de, fr |
| | tag | | Products |
| | langs | | |
| | | lang | en |
| | | title | New models! - AVR-XXXX |
| | | message | The new way to enjoy music<br>… |
| | | lang | jp |
| | | title | 新製品情報 - AVR-XXXX |
| | | message | 音楽の新しい楽しみ方を<br>… |
| | | lang | de |
| | | title | Neue Modelle - AVR-XXXX |
| | | message | Eine neue Art, Musik zu genießen<br>… |
| | | … | |
| | … | | |

FIG.8 id20160501.json (THIRD FILE)

| | | | |
|---|---|---|---|
| id | | | id20160501 |
| updated_at | | | 20160501 |
| previous_url | | | http://sample.com/id20160601.json |
| next_url | | | http://sample.com/id20160401.json |
| articles | | | |
| | created_at | | 20160501 |
| | model names | | All |
| | region | | All |
| | tag | | App |
| | langs | | |
| | | lang | en |
| | | title | Version 1.10 |
| | | message | Bug fixes |
| | | lang | jp |
| | | title | バージョン 1.10 |
| | | message | 不具合修正 |
| | | lang | de |
| | | title | Version 1.10 |
| | | message | Fehlerbehebung |
| | | ... | |
| | created_at | | 20160420 |
| | model names | | All |
| | region | | us |
| | tag | | Service |
| | langs | | |
| | | lang | en |
| | | title | Streaming-radio |
| | | message | Streaming-radio now available<br>... |
| | | lang | jp |
| | | title | |
| | | message | |
| | | lang | de |
| | | title | |
| | | message | |
| | | ... | |
| | ... | | |

FIG.9 id20160401.json (FOURTH FILE)

| | | | |
|---|---|---|---|
| id | id20160401 | | |
| updated_at | 20160401 | | |
| previous_url | http://sample.com/id20160501.json | | |
| next_url | null | | |
| articles | | | |
| | created_at | 20160401 | |
| | model names | All | |
| | region | All | |
| | tag | Movie | |
| | langs | | |
| | | lang | en |
| | | title | Introduce App |
| | | message | |
| | | url | http://sample.com/movie1-en.mp4 |
| | | lang | jp |
| | | title | App紹介 |
| | | message | |
| | | url | http://sample.com/movie1-jp.mp4 |
| | | lang | de |
| | | title | Einführung App |
| | | message | |
| | | url | http://sample.com/movie1-de.mp4 |

What's New

Version 1.20 June-1, 2016

New functions available

New Models! — AVR-XXXX May-20, 2016

The new way to enjoy music

.......

.....

...

Version 1.10 May-1, 2016

Bug fixes

Introduce App Apr-1, 2016

FIG.13 id20160601.json (SECOND FILE)

| | | |
|---|---|---|
| id | id20160601 | |
| updated_at | 20160601 | |
| previous_url | http://sample.com/update.json | |
| next_url | http://sample.com/id20160501.json | |
| articles | | |
| | created_at | 20160601 |
| | model names | All |
| | region | All |
| | tag | App |
| | article_url | http://saple.com/id20160601-1.json |
| | created_at | 20160520 |
| | model names | AVR-XXXX |
| | region | us, jp, de, fr |
| | tag | Products |
| | article_url | http://saple.com/id20160601-2.json |

FIG.14 id20160601-1.json (THIRD FILE)

| | | |
|---|---|---|
| article_id | | id20160601-1 |
| created_at | | 20160601 |
| model names | | All |
| region | | All |
| tag | | App |
| langs | | |
| | lang | en |
| | title | Version 1.20 |
| | message | New functions are available. |
| | lang | jp |
| | title | バージョン 1.20 |
| | message | 新しい機能が追加されました |
| | lang | de |
| | title | Version 1.20 |
| | message | Neue Funktionen zur Verfügung. |
| | ... | |

FIG.15 id20160601-2.json (FOURTH FILE)

| | | |
|---|---|---|
| article_id | id20160601-2 | |
| created_at | 20160520 | |
| model names | AVR-XXXX | |
| region | us, jp, de, fr | |
| tag | Products | |
| langs | | |
| | lang | en |
| | title | New models! - AVR-XXXX |
| | message | The new way to enjoy music<br>… |
| | lang | jp |
| | title | 新製品情報 - AVR-XXXX |
| | message | 音楽の新しい楽しみ方を<br>… |
| | lang | de |
| | title | Neue Modelle - AVR-XXXX |
| | message | Eine neue Art, Musik zu genießen<br>… |
| | … | |

FIG.16 id20160501.json (FIFTH FILE)

| | | |
|---|---|---|
| id | | id20160501 |
| updated_at | | 20160501 |
| previous_url | | http://sample.com/update.json |
| next_url | | http://sample.com/id20160501.json |
| articles | | |
| | created_at | 20160501 |
| | model names | All |
| | region | All |
| | tag | App |
| | article_url | http://saple.com/id20160501-1.json |
| | created_at | 20160420 |
| | model names | All |
| | region | us |
| | tag | Service |
| | article_url | http://saple.com/id20160501-2.json |

FIG.17 id20160501-1.json (SIXTH FILE)

| | | |
|---|---|---|
| article_id | | |
| created_at | | |
| mode names | All | |
| region | All | |
| tag | App | |
| langs | | |
| | lang | en |
| | title | Version 1.10 |
| | message | Bug fixes |
| | lang | jp |
| | title | バージョン 1.10 |
| | message | 不具合修正 |
| | lang | de |
| | title | Version 1.10 |
| | message | Fehlerbehebung |
| | ... | |

FIG.18 id20160501-2.json (SEVENTH FILE)

| | | |
|---|---|---|
| article_id | | |
| created_at | | |
| model names | All | |
| region | us | |
| tag | Service | |
| langs | | |
| | lang | en |
| | title | Streaming-radio |
| | message | Streaming-radio now available<br>… |
| | lang | jp |
| | title | |
| | message | |
| | lang | de |
| | title | |
| | message | |
| | … | |

FIG.19 id20160401.json (EIGHTH FILE)

| | | |
|---|---|---|
| id | | id20160401 |
| updated_at | | 20160401 |
| previous_url | | http://sample.com/id20160501.json |
| next_url | | null |
| articles | | |
| | created_at | 20160401 |
| | model names | All |
| | region | All |
| | tag | Movie |
| | article_url | http://saple.com/id20160401-1.json |

FIG.20 id20160401-1.json (NINTH FILE)

| | | |
|---|---|---|
| article_id | | id20160601-3 |
| created_at | | 20160401 |
| mode names | | All |
| region | | All |
| tag | | Movie |
| langs | | |
| | lang | en |
| | title | Introduce App |
| | message | |
| | url | http://sample.com/movie1-en.mp4 |
| | lang | jp |
| | title | App 紹介 |
| | message | |
| | url | http://sample.com/movie1-jp.mp4 |
| | lang | de |
| | title | Einführung App |
| | message | |
| | url | http://sample.com/movie1-de.mp4 |

CONTROL DEVICE, CONTROL TARGET DEVICE, AND PROCESSING METHOD FOR DISPLAY DATA

CROSS-REFERENCE TO RELATED APPLICATION

The present application is continuation of International Application No. PCT/JP2016/078053 filed on Sep. 23, 2016. The contents of this application is hereby incorporated by reference into this application.

BACKGROUND OF THE INVENTION

1. Field of the Invention

The present invention relates to a control device, a control target device, and a processing method for display data.

2. Description of the Related Art

In Japanese Patent Application Laid-open No. 2013-65206, there is disclosed a control device connected to a server device through a network. When the control device notifies the server device of a type and version of an installed application, the server device transmits information on the latest version of the application to the control device. The control device displays update information on the application based on the received information.

However, the related-art device cannot display individual specific information on a control target device to be controlled by the control device.

SUMMARY OF THE INVENT ION

The present disclosure has been made in view of the above-mentioned problem, and has an object to provide a control device capable of displaying specific individual information on a control target device.

According to one embodiment of the present disclosure, there is provided a control device, including: a communication device configured to receive, from a control target device connected to the control device through a network, configuration information on a configuration of software and/or hardware of the control target device; a controller configured to acquire a display article from a server device connected to the control device through the network, and determine whether to store the display article in a storage as display data, based on the configuration information; and the storage configured to store the display data based on the determination by the controller.

According to one embodiment of the present disclosure, there is provided a control target device, including: a storage configured to store configuration information on a configuration of software and/or hardware of the control target device; a controller configured to instruct a communication device to transmit the configuration information; and the communication device configured to receive a configuration information request signal from a control device connected to the control target device through a network, and transmit the configuration information.

According to one embodiment of the present disclosure, there is provided a processing method for display data, the processing method including: receiving, from a control target device connected through a network, configuration information on a configuration of software and/or hardware of the control target device; acquiring a display article from a server device connected through the network; determining whether to store the display article in a storage as display data, based on configuration information; and storing the display data based on the determination.

BRIEF DESCRIPTION OF THE DRAWINGS

FIG. 4 is a schematic diagram for illustrating a file to be downloaded from a server device by the control device according to this embodiment.

FIG. 5 is a schematic diagram for illustrating a file to be downloaded from the server device by the control device according to this embodiment.

FIG. 8 is a schematic diagram for illustrating a file to be downloaded from the server device by the control device according to this embodiment.

FIG. 9 is a schematic diagram for illustrating a file to be downloaded from the server device by the control device according to this embodiment.

FIG. 13 is a schematic diagram for illustrating a file to be downloaded from the server device by the control device according to this embodiment.

FIG. 14 is a schematic diagram for illustrating a file to be downloaded from the server device by the control device according to this embodiment.

FIG. 15 is a schematic diagram for illustrating a file to be downloaded from the server device by the control device according to this embodiment.

FIG. 16 is a schematic diagram for illustrating a file to be downloaded from the server device by the control device according to this embodiment.

FIG. 17 is a schematic diagram for illustrating a file to be downloaded from the server device by the control device according to this embodiment.

FIG. 18 is a schematic diagram for illustrating a file to be downloaded from the server device by the control device according to this embodiment.

FIG. 19 is a schematic diagram for illustrating a file to be downloaded from the server device by the control device according to this embodiment.

FIG. 20 is a schematic diagram for illustrating a file to be downloaded from the server device by the control device according to this embodiment.

DETAILED DESCRIPTION OF THE INVENTION

First Embodiment

Embodiments of the present disclosure are described below with reference to the accompanying drawings.

Figure 1:
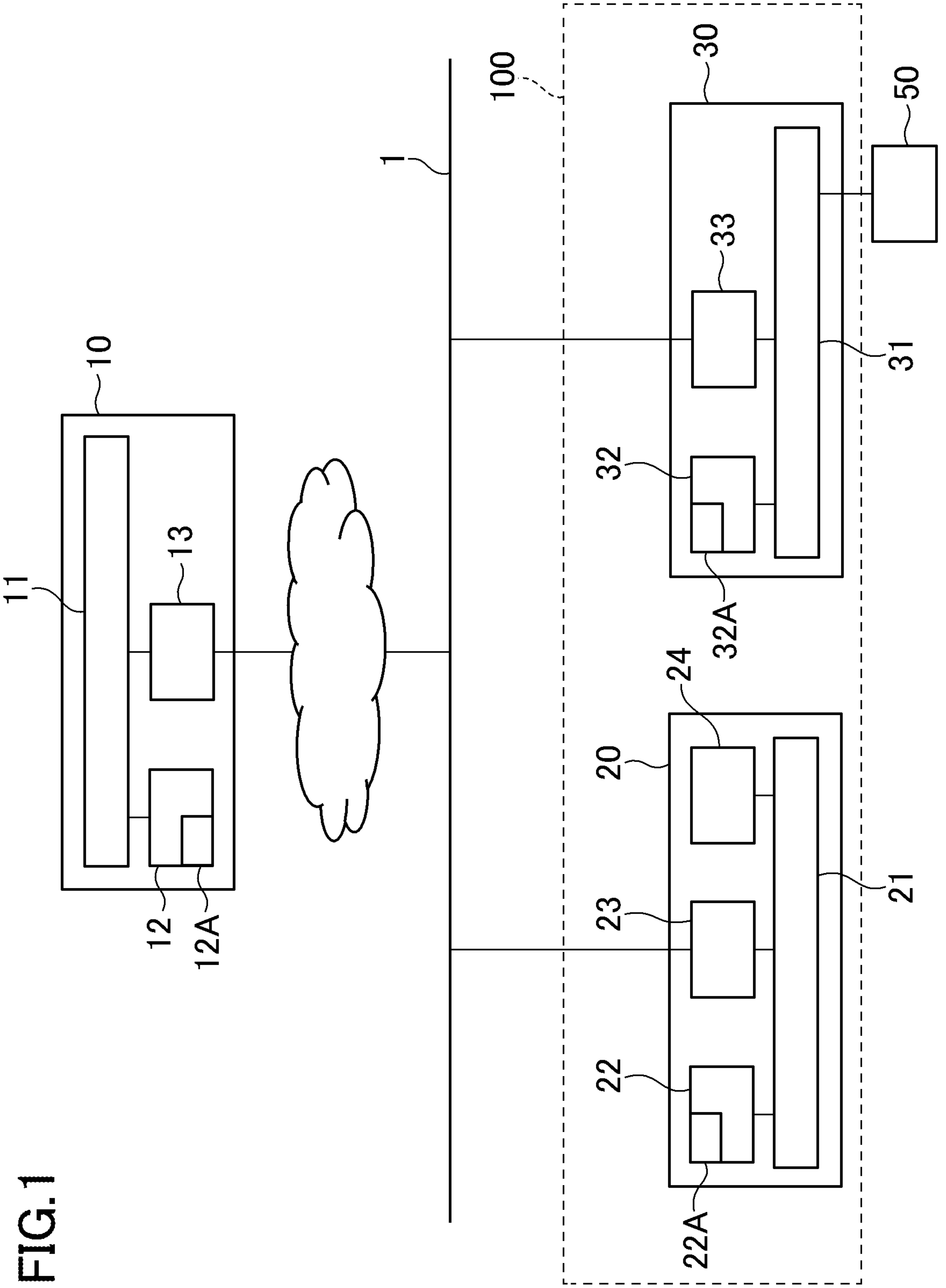
FIG. 1 is a schematic diagram for illustrating a control device and a control target device according to an embodiment of the present disclosure.
Figure 2:
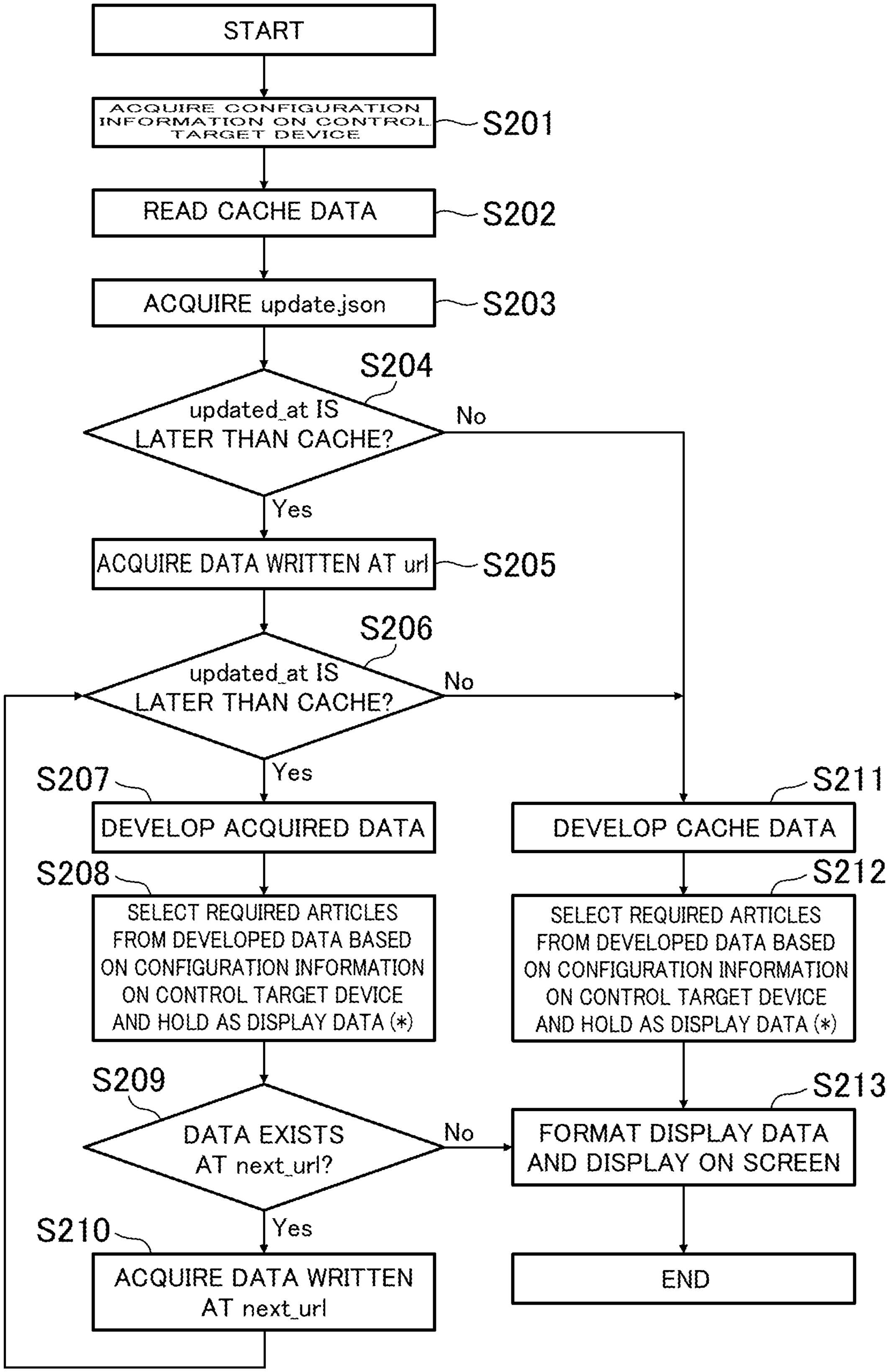
FIG. 2 is a flowchart for illustrating an example of a processing method for display data according to this embodiment.

FIG. 1 is a schematic diagram for illustrating a control device and a control target device according to a first embodiment of the present disclosure.

As illustrated in FIG. 1, a control device 20 is connected to a server device 10 through a network 1. Moreover, the control device 20 is connected to a control target device 30 through the network 1. A control system 100 is formed of the control device 20 and the control target device 30.

The network 1 includes, for example, a wireless local area network (LAN), a wired LAN, and a wide area network (WAN), and is used as an information transmission path among the control device 20, the server device 10, and the control target device 30.

(Configuration of Server Device 10) The server device 10 includes a controller 11, a storage 12, and a communication device 13.

The controller 11 includes, for example, a CPU and an MPU, and operates in accordance with a program 12A stored in the storage 12. The controller 11 is configured to control the entire server device 10 in accordance with the program 12A, and control operations and the like of the storage 12 and the communication device 13.

The storage 12 is formed of an information storage medium such as a ROM, a RAM, and a hard disk drive, and stores, in addition to the program 12A, update information on applications for the control device 20, and stores function information, update information on firmware, sales information on related devices, and information on starts of services provided for specific regions of the control target device 30.

The communication device 13 is configured to deliver various types of information to the control device 20 and the like through the network 1 in accordance with an instruction of the controller 11.

(Configuration of Control Device 20)

The control device 20 is a computer such as a smartphone, a feature phone, a tablet computer, and a personal computer, and is a device capable of connecting to the network 1, and capable of operating the control target device 30. In this embodiment, description is made of a case in which the control device 20 is a smartphone. The control device 20 includes a controller 21, a storage 22, a communication device 23, and a display 24.

The controller 21 includes, for example, a CPU and an MPU, and operates in accordance with a program 22A stored in the storage 22. The controller 21 is configured to control the entire control device 20 in accordance with the program 22A, and control operations and the like of the storage 22, the communication device 23, and the display 24.

The storage 22 is formed of an information storage medium such as a ROM, a RAM, and a hard disk drive, and is capable of storing, in addition to the program 22A, the update information on the applications, and storing the function information, the update information on the firmware, the sales information on the related devices, and the information on starts of services provided for specific regions of the control target device 30, which are received from the server device 10.

The communication device 23 is configured to receive various types of information from the server device 10, and transmit a control signal to the control target device 30 through the network 1 in accordance with an instruction of the controller 21. The control signal includes a configuration information request signal described later.

The display 24 is configured to display the update information on the applications, the function information, the update information on the firmware, the sales information on the related devices, and the information on starts of services provided for specific regions of the control target device 30 in accordance with an instruction of the controller 21. In this embodiment, the control device 20 includes the display 24, but the display 24 may be a device externally connected to the control device 20.

(Configuration of Control Target Device 30)

The control target device 30 is a device to be controlled by the control device 20 through the network 1, and is a computer such as a video reproduction device, an audio reproduction device such as an AV receiver, a sound bar, and a CD player, a television receiver, a washing machine, a vacuum cleaner, an automatic water heater, an air conditioner, and a car navigation system. The control target device 30 includes a controller 31, a storage 32, and a communication device 33. When the control target device 30 is, for example, a video reproduction device or a sound reproduction device, the controller 31 is externally connected to a speaker 50.

The controller 31 includes, for example, a CPU and an MPU, and operates in accordance with a program 32A stored in the storage 32. The controller 31 is configured to control the entire control target device 30 in accordance with the program 32A, and control operations and the like of the storage 32, and the communication device 33.

The storage 32 is formed of an information storage medium such as a ROM, a RAM, and a hard disk drive, and is capable of storing configuration information on the control target device 30, firmware received from the control device 20, and the like in addition to the program 32A. The configuration information on the control target device 30 is information on a configuration of software and/or hardware of the control target device 30, and includes, for example, a device name, models, sales target regions, system version information, available functions, and a standard display language. Anew function can be added to the control target device 30, and a defect can be corrected by the controller 31 executing new firmware stored in the storage 32.

The communication device 33 is configured to receive a control signal and firmware from the control device 20, and transmit configuration information on the control target device 30 to the control device 20 through the network 1 in accordance with an instruction of the controller 31.

When the control target device 30 is, for example, a video reproduction device or an audio reproduction device, the control target device 30 outputs a sound signal to the speaker 50 connected externally based on a control signal received from the control device 20. The speaker 50 outputs the sound signal input from the control target device 30 as a sound. In this embodiment, the control target device 30 is externally connected to the speaker 50, but the control target device 30 may include the speaker 50.

(First Information Processing Example)

With reference to FIG. 2 to FIG. 12, description is now made of first information processing example.

FIG. 2, FIG. 3, FIG. 6, and FIG. 7 are flowcharts for illustrating examples of a processing method for display data according to this embodiment.

FIG. 4, FIG. 5, FIG. 8, and FIG. 9 are schematic diagrams for illustrating files to be downloaded from the server device by the control device according to this embodiment.

Figure 10:
FIG. 10 is a schematic diagram for illustrating details of display on a display of the control device according to this embodiment.
Figure 11:
FIG. 11 is a schematic diagram for illustrating details of display on the display of the control device according to this embodiment.
Figure 12:
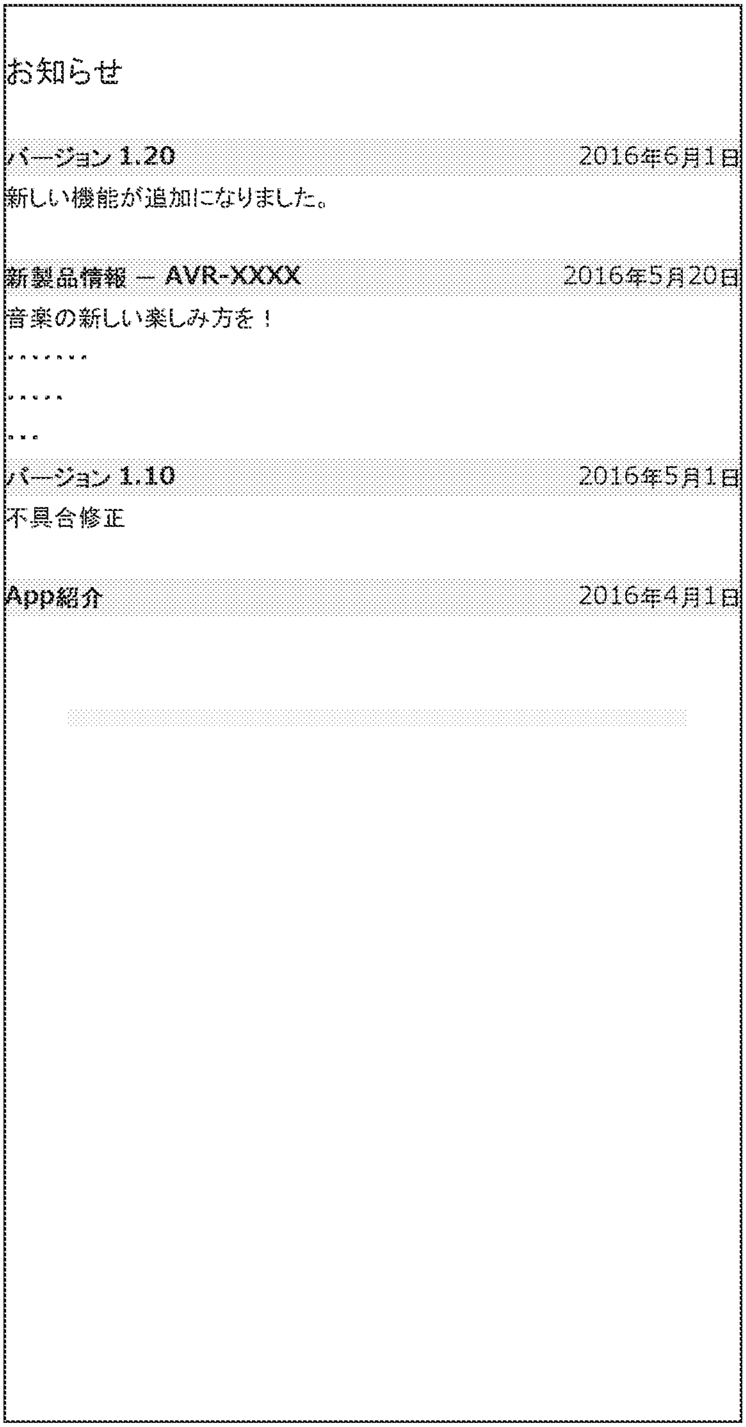
FIG. 12 is a schematic diagram for illustrating details of display on the display of the control device according to this embodiment.

FIG. 10 to FIG. 12 are schematic diagrams for illustrating details of display on the display of the control device according to this embodiment.

In Step S201, the communication device 23 of the control device 20 receives the configuration information on the control target device 30 from the control target 30 through the network 1. Specifically, the configuration information request signal is transmitted from the communication device 23 of the control device 20 to the control target device 30. Then, the communication device 33 of the control target device 30 receives the control information request signal through the network 1, and transmits the configuration information to the control device 20. Then, the communication device 23 of the control device 20 receives the configuration information on the control target device 30 through the network 1.

In Step S202, the controller 21 of the control device 20 reads cache data acquired in advance. On this occasion, the cache data acquired in advance by the control device 20 is, for example, the update information on the applications, and the function information, the update information on the firmware, the sales information on the related devices, and the information on starts of services provided for specific regions of the control target device 30, and the cache data is stored in the storage 22.

In Step S203, the control device 20 acquires "update.json", which is a first file, from the server device 10 through the network 1. In the first file, as illustrated in FIG. 4, an ID of the file, an update date "updated at", and a link destination of data "url" are described.

In Step S204, the controller 21 of the control device 20 compares an acquisition date of the cache data read in Step S202 and the update date of the first file acquired in Step S203 with each other. In this embodiment, it is assumed that the acquisition date of the cache data is March 31. The update date of the first file is June 1 as indicated in an entry of "updated at" of FIG. 4, which is later than March 31, which is the acquisition date of the cache data. Therefore, the flow proceeds to Step S205.

In Step S205, the control device 20 acquires the second file "id20160601.json" from the link destination "url" described in the first file. In the second file, as illustrated in FIG. 5, an ID of the file, the update date "updated at", a link destination of the previous file "previous url", a link destination of a next file "next url", and display articles "articles" are described.

In Step S206, the controller 21 of the control device 20 compares an acquisition date of the cache data read in Step S202 and the update date of the second file acquired in Step S205 with each other. In this embodiment, it is assumed that the acquisition date of the cache data is March 31. The update date of the second file is June 1 as indicated in an entry of "updated at" of FIG. 5, which is later than March 31, which is the acquisition date of the cache data. Therefore, the flow proceeds to Step S207.

In Step S207, the controller 21 of the control device 20 develops the acquired display articles "articles". The display articles "articles" contains a created date "created at", model names of target devices "model names", sales target regions "region", a file management tag "tag", and display languages "langs".

In Step S208, the controller 21 of the control device 20 selects required articles from the respective display articles "articles" developed in Step S207 based on the configuration information on the control target device 30 connected to the control device 20 through the network 1, and stores the selected required articles in the storage 22 as display data. Details of Step S208 are illustrated in FIG. 3.

Figure 3:
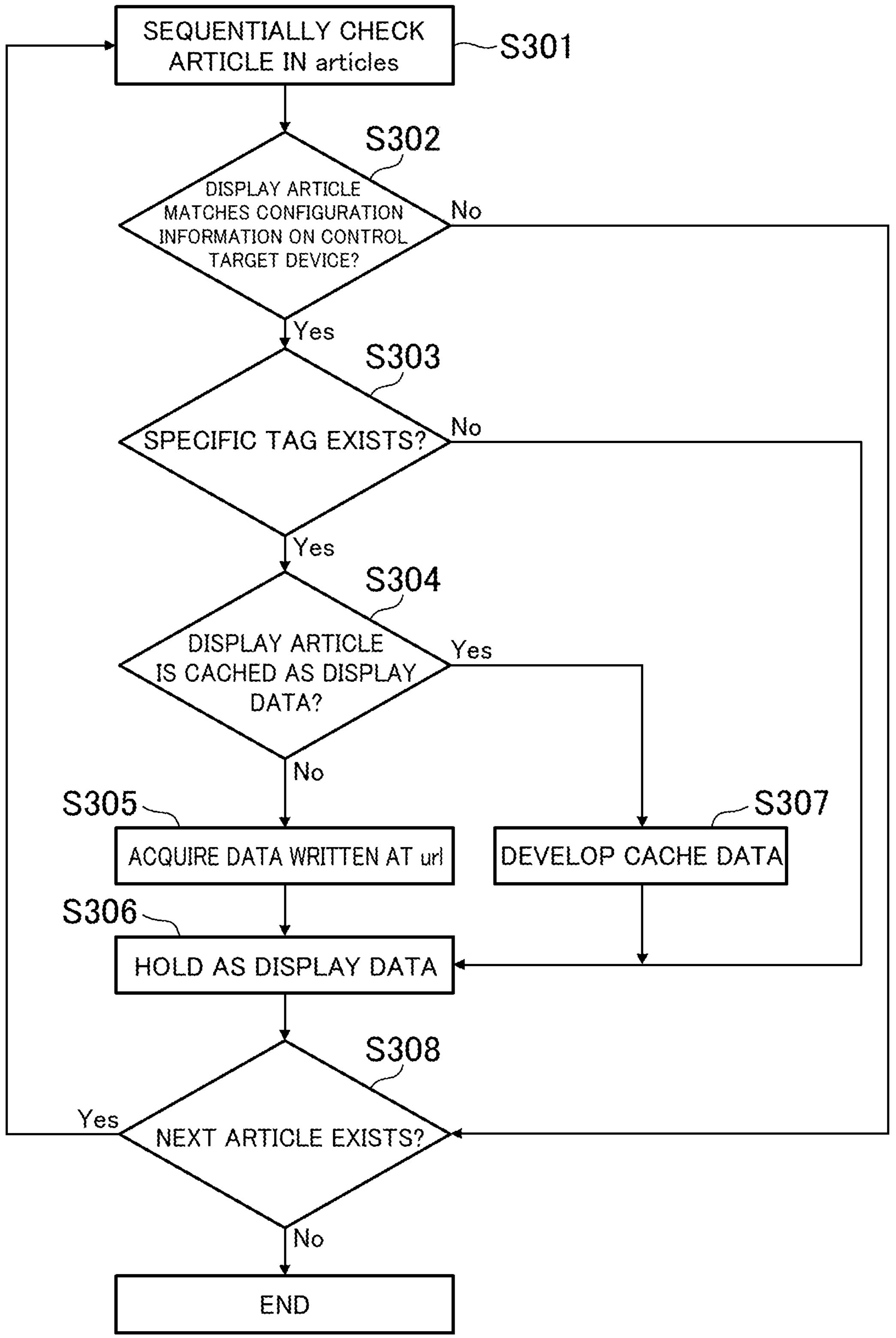
FIG. 3 is a flowchart for illustrating an example of the processing method for display data according to this embodiment.

In Step S301 illustrated in FIG. 3, the controller 21 of the control device 20 starts to sequentially check the respective articles in the display articles "articles" from the top.

In Step S302, the controller 21 of the control device 20 determines whether one of the display articles "articles" matches the configuration information on the control target device 30. In this embodiment, the model of the control target device 30 is AVR-0100, and the sales target region is France.

As illustrated in FIG. 5, the display articles "articles" of the second file include a first display article having a created date of June 1, and a second display article having a created date of May 20. The controller 21 of the control device 20 first determines whether the first display article matches the configuration information on the control target device 30.

In the first display article, the model names "model names" of the target devices are indicated as "All", and the sales target regions "region" are indicated as "All". That is, the first display article is subject to all device models, and is subject to all sales target regions. Thus, the controller 21 determines that the first display article matches the configuration information on the control target device 30, and the flow proceeds to Step S303.

In Step S303, the controller 21 of the control device 20 determines whether the file management tag "tag" in the display article contains a specific tag. The specific tag is a tag meaning that the display article contains a specific type of data. The specific type of data is data that generally tends to have a large size such as a still image, a moving image, and a sound. This specific tag is stored in the storage 22 of the control device 20, and the controller 21 determines whether the description of the "tag" entry of the display article and the stored specific tag match each other. As illustrated in FIG. 5, the tag of the first display article is indicated as "App". This tag means that the first display article is a display article relating to the application of the control device 20. The "App" tag, which means that the display article relates to the application, does not match the specific tag stored in the storage 22. Thus, the controller 21 determines that the specific tag is not contained in the first display article, and the flow proceeds to Step S306.

In Step S306, the control device 20 stores the first display article as display data in the storage 22. On this occasion, the first display article contains, as indicated in the entry "langs" of FIG. 5, three pieces of data described in selectable display languages. Respective entries "lang" of the three pieces of data indicating selectable display languages indicate "en", "jp", and "de". That is, the first display article can be displayed in any one of English, Japanese, and German. As a selection method for the display language, there are a method of selecting the display language by referring to a standard display language of the control device 20 and a method of selecting the display language by referring to a standard display language of the control target device 30.

Figure 6:
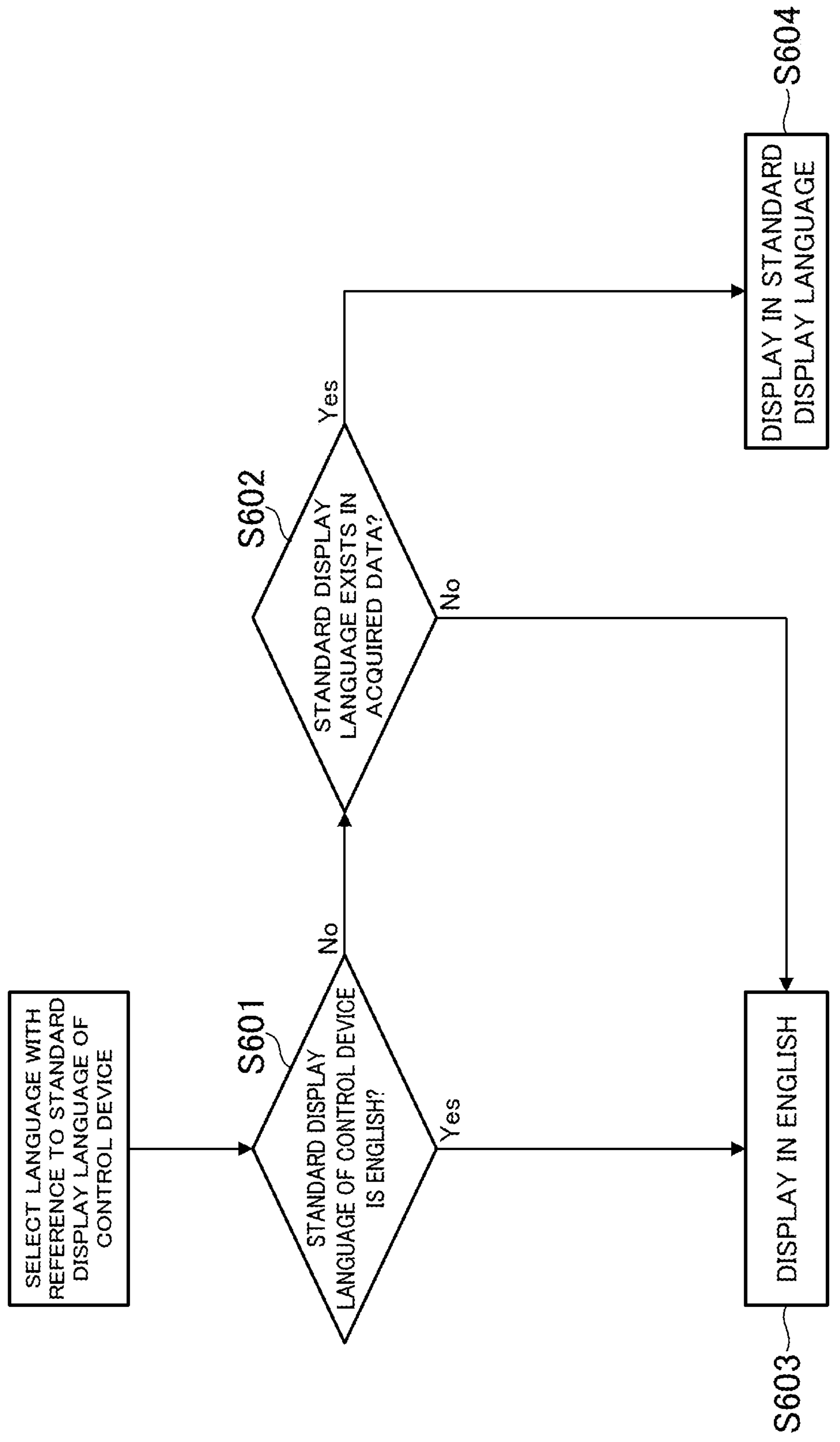
FIG. 6 is a flowchart for illustrating an example of the processing method for display data according to this embodiment.

First, referring to FIG. 6, description is made of an example in which the controller 21 selects the display language of the display article by referring to the standard display language of the control device 20.

In Step S601, the controller 21 of the control device 20 determines whether the standard display language of the control device 20 is English. When the standard display language of the control device 20 is English, the display language of the display article is determined to be English (Step S603). In this embodiment, it is assumed that the standard display language of the control device 20 is French, and the flow thus proceeds to Step S602.

In Step S602, the controller 21 of the control device 20 determines whether the standard display language of the control device 20 exists in the data acquired from the server device 10. As described above, the first display article contains English, Japanese, and German as the selectable display languages, but French is not contained as the selectable display language. Thus, the controller 21 of the control device 20 selects English as the display language of the display article (Step S603), and stores a display title "Version 1.20" in English and a message "New functions are available." in English illustrated in FIG. 5 as the display data in the storage 22.

When the standard display language of the control device 20 is, for example, Japanese, the selectable display languages of the first display article contain the standard display language of the control device 20. Therefore, the controller 21 of the control device 20 selects Japanese as the display language of the display article (Step S604), and stores a display title "Version 1.20" in Japanese and a message "New functions are available." in Japanese illustrated in FIG. 5 as the display data in the storage 22.

Figure 7:
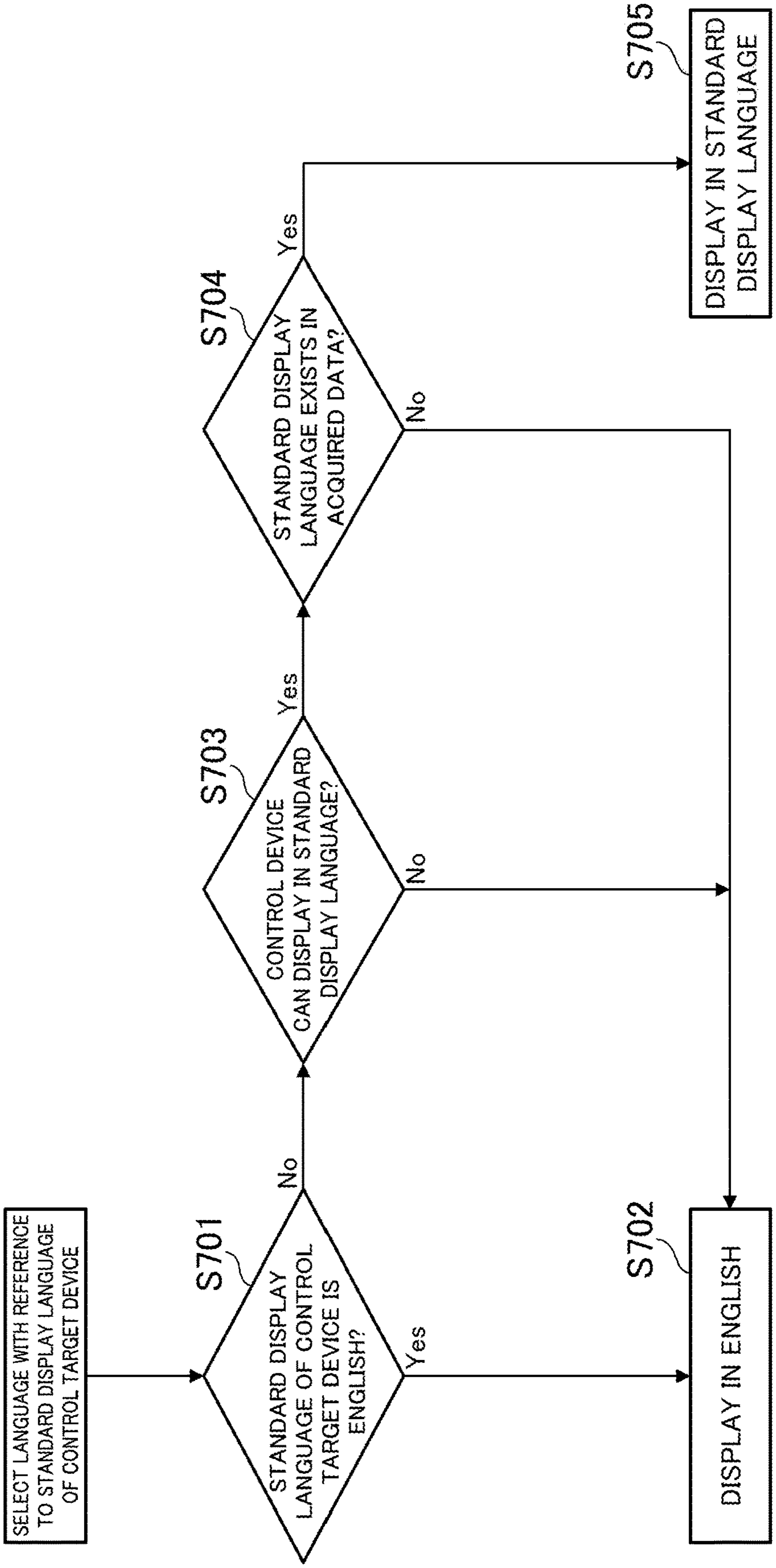
FIG. 7 is a flowchart for illustrating an example of the processing method for display data according to this embodiment.

Next, referring to FIG. 7, description is made of an example in which the controller 21 selects the display language of the display article by referring to the standard display language of the control target device 30.

In Step S701, the controller 21 of the control device 20 determines whether the standard display language of the control target device 30 is English. The standard display language of the control target device 30 is contained in the configuration information on the control target device 30 received in Step S201. When the standard display language of the control target device 30 is English, the display language of the display article is determined to be English (Step S702). In this embodiment, it is assumed that the standard display language of the control target device 30 is French, and the flow thus proceeds to Step S703.

In Step S703, the controller 21 of the control device 20 determines whether the standard display language of the control target device 30 can be displayed. On this occasion, when the display 24 of the control device 20 cannot display the standard display language of the control target device 30, the display language of the display article is determined to be English (Step S702). In this embodiment, it is assumed that the controller 21 of the control device 20 determines that the display 24 of the control device 20 can display French, which is the standard display language of the control target device 30, and the flow thus proceeds to Step S704.

In Step S704, the controller 21 of the control device 20 determines whether the standard display language of the control target device 30 exists in the data acquired from the server device 10. As described above, the first display article contains English, Japanese, and German as the selectable display languages, but French is not contained as the selectable display language. Thus, the controller 21 of the control device 20 selects English as the display language of the display article (Step S702), and stores a display title "Version 1.20" in English and a message "New functions are available." in English illustrated in FIG. 5 as the display data in the storage 22.

When the standard display language of the control target device 30 is, for example, Japanese, the selectable display languages of the first display article contain the standard display language of the control target device 30. Therefore, the controller 21 of the control device 20 selects Japanese as the display language of the display article (Step S705), and stores a display title "Version 1.20" in Japanese and a message "New functions are available." in Japanese illustrated in FIG. 5 as the display data in the storage 22.

Now, description returns to the flow illustrated in FIG. 3.

In Step S308, the control device 20 determines whether the display articles "articles" contain another article. On this occasion, as illustrated in FIG. 5, the display articles "articles" contain the second display article having the created date of May 20, and the flow thus returns to Step S301.

In Step S301, the control device 20 starts to check the second display article in the display articles "articles".

In Step S302, the controller 21 of the control device 20 determines whether the second display article matches the configuration information on the control target device 30. As described above, in this embodiment, the model of the control target device 30 is AVR-0100, and the sales target region is France.

As illustrated in FIG. 5, in the second display article contained in the display articles "articles", the model names "model names" of the target devices are indicated as "AVR-XXX", and the sales target regions "region" are indicated as "us, jp, de, fr". In other words, the second display article is subject only to a series of device models having the name "AVR", and is subject only to the devices having the United States, Japan, Germany, and France as the sales target regions. In this embodiment, the model of the control target device 30 is AVR-0100, and is thus contained in the "AVR" series. Moreover, the sales target region is France, and is contained in the target regions of the second display article. Thus, the controller 21 determines that the second display article matches the configuration information on the control target device 30, and the flow proceeds to Step S303.

In Step S303, the controller 21 of the control device 20 determines whether the file management tag "tag" in the display article contains the specific tag. This specific tag is stored in the storage 22 of the control device 20, and the controller 21 determines whether the description of the "tag" entry of the display article and the stored specific tag match each other. As illustrated in FIG. 5, the tag of the second display article is indicated as "Products". This tag means that the second display article is a display article relating to article information on the control device 30. This article information contains, for example, the update information on the firmware of the control target device 30, an introduction of functions of the control target device 30, the sales information on devices relating to the control target device 30, and sales information on new products. The "Products" tag, which means that the display article relates to the article information, does not match the specific tag stored in the storage 22. Thus, the controller 21 determines that the specific tag is not contained in the second display article, and the flow proceeds to Step S306.

In Step S306, the control device 20 stores the second display article in the storage 22 as display data. On this occasion, for the second display article, as indicated in the entry "langs" of FIG. 5, three pieces of data described in selectable display languages are contained. Respective entries "lang" of the three pieces of data indicating selectable display languages indicate "en", "jp", and "de". That is, the second display article can be displayed in anyone of English, Japanese, and German. A selection method for the display language is the same as those described above, and detailed description thereof is thus omitted.

In this embodiment, the standard display language of the control device 20 is French, and is not contained in the selectable display languages of the second display article. Thus, the controller 21 of the control device 20 selects English as the display language of the second display article, and stores a display title "New Models!-AVR-XXXX" in English and a message "The new way to enjoy music." in English illustrated in FIG. 5 as the display data in the storage 22.

Now, description returns to the flow illustrated in FIG. 3.

In Step S308, the controller 21 of the control device 20 determines whether the display articles "articles" contain another article. On this occasion, as illustrated in FIG. 5, no other article is contained in the display articles "articles". Thus, the flow illustrated in FIG. 3 is finished, and the flow proceeds to Step S209 illustrated in FIG. 2.

In Step S209, the controller 21 of the control device 20 determines whether a link destination, which is a next file, exists. As illustrated in FIG. 5, the link destination "next url", which is an entry indicating a next file, is described in the second file, and the flow thus proceeds to Step S210.

In Step S210, the control device 20 acquires the third file "id20160501.json" from the link destination "next url" described in the second file. In the third file, as illustrated in FIG. 8, an ID of the file, the update date "updated at", a link destination of the previous file "previous url", a link destination of a next file "next url", and display articles "articles" are described. On this occasion, the flow returns to Step S206.

In Step S206, the controller 21 of the control device 20 compares an acquisition date of the cache data read in Step S202 and the update date of the third file acquired in Step S210 with each other. In this embodiment, it is assumed that the acquisition date of the cache data is March 31. The update date of the third file is May 1 as indicated in an entry of "updated at" of FIG. 8, which is later than May 31, which is the acquisition date of the cache data. Therefore the flow proceeds to Step S207.

In Step S207, the controller 21 of the control device 20 develops the acquired display articles "articles". The display articles "articles" contains a created date "created at", model names of target devices "model names", sales target regions "region", a file management tag "tag", and display languages "langs".

In Step S208, the controller 21 of the control device 20 selects required articles from the respective display articles "articles" developed in Step S207 based on the configuration information on the control target device 30 connected to the control device 20 through the network 1, and stores the selected required articles in the storage 22 as display data. Details of Step S208 are illustrated in FIG. 3.

In Step S301 illustrated in FIG. 3, the controller 21 of the control device 20 starts to sequentially check the respective articles in the display articles "articles" from the top.

In Step S302, the controller 21 of the control device 20 determines whether one of the display articles "articles" matches the configuration information on the control target device 30.

As illustrated in FIG. 8, the display articles "articles" of the third file include a first display article having a created date of May 1, and a second display article having a created date of April 20. The control device 20 first determines whether the first display article matches the configuration information on the control target device 30.

In the first display article, the model names "model names" of the target devices are indicated as "All", and the sales target regions "region" are indicated as "All". That is, the first display article is subject to all device models, and is subject to all sales target regions. Thus, the controller 21 determines that the first display article matches the configuration information on the control target device 30, and the flow proceeds to Step S303.

In Step S303, the controller 21 of the control device 20 determines whether the file management tag "tag" in the display article contains a specific tag. This specific tag is stored in the storage 22 of the control device 20, and the controller 21 determines whether the description of the "tag" entry of the display article and the stored specific tag match each other. As illustrated in FIG. 8, the tag of the first display article is indicated as "App". This tag means that the first display article is a display article relating to the application of the control device 20. The "App" tag, which means that the display article relates to the application, does not match the specific tag stored in the storage 22. Thus, the controller 21 determines that the specific tag is not contained in the first display article, and the flow proceeds to Step S306.

In Step S306, the control device 20 stores the first display article as display data in the storage 22. On this occasion, the first display article contains, as indicated in the entry "langs" of FIG. 8, three pieces of data described in selectable display languages. Respective entries "lang" of the three pieces of data indicating selectable display languages indicate "en", "jp", and "de". That is, the first display article can be displayed in any one of English, Japanese, and German. A selection method for the display language is the same as those described above, and detailed description thereof is thus omitted.

In this embodiment, the standard display language of the control device 20 is French, and is not contained in the selectable display languages of the first display article. Thus, the controller 21 of the control device 20 selects English as the display language of the display article, and stores a display title "Version 1.10" in English and a message "Bug fixes." in English illustrated in FIG. 8 as the display data in the storage 22.

In Step S308, the controller 21 of the control device 20 determines whether the display articles "articles" contain another article. On this occasion, as illustrated in FIG. 8, the display articles "articles" contain the second display article having the created date of April 20, and the flow thus returns to Step S301.

In Step S301, the controller 21 of the control device 20 checks the second display article in the display articles "articles".

In Step S302, the controller 21 of the control device 20 determines whether the second display article matches the configuration information on the control target device 30. As described above, in this embodiment, the model of the control target device 30 is AVR-0100, and the sales target region is France.

As illustrated in FIG. 8, in the second display article contained in the display articles "articles", the model names "model names" of the target devices are indicated as "All", and the sales target regions "region" are indicated as "us". That is, the second display article is subject to all device models, and is subject only to devices having the United States as the sales target region. In this embodiment, the sales target region of the control target device 30 is France, and is not contained in the target region of the second display article. Thus, the controller 21 determines that the second display article does not match the configuration information on the control target device 30, and the storage 22 does not store the second display article as the display data. The flow then proceeds to Step S308.

In Step S308, the control device 20 determines whether the display articles "articles" contain another article. On this occasion, as illustrated in FIG. 8, no other article is contained in the display articles "articles". Thus, the flow illustrated in FIG. 3 is finished, and the flow proceeds to Step S209 illustrated in FIG. 2.

In Step S209, the controller 21 of the control device 20 determines whether a link destination, which is a next file, exists. As illustrated in FIG. 8, the link destination "next url", which is an entry indicating a next file, is described in the third file, and the flow thus proceeds to Step S210.

In Step S210, the control device 20 acquires the fourth file "id20160401.json" from the link destination "next url" described in the third file. In the fourth file, as illustrated in FIG. 9, an ID of the file, the update date "updated at", a link destination of the previous file "previous url", a link destination of a next file "next url", and display articles "articles" are described. On this occasion, the flow returns to Step S206.

In Step S206, the controller 21 of the control device 20 compares an acquisition date of the cache data read in Step S202 and the update date of the fourth file acquired in Step S210 with each other. In this embodiment, it is assumed that the acquisition date of the cache data is March 31. The update date of the fourth file is April 1 as indicated in an entry of "updated at" of FIG. 9, which is later than March 31, which is the acquisition date of the cache data. Therefore the flow proceeds to Step S207.

In Step S207, the controller 21 of the control device 20 develops the acquired display articles "articles". The display articles "articles" contains a created date "created at", model names of target devices "model names", sales target regions "region", a file management tag "tag", and display languages "langs".

In Step S208, the controller 21 of the control device 20 selects required articles from the respective display articles "articles" developed in Step S207 based on the configuration information on the control target device 30 connected to the control device 20 through the network 1, and stores the selected required articles in the storage 22 as display data. Details of Step S208 are illustrated in FIG. 3.

In Step S301, the controller 21 of the control device 20 starts to check the display articles in the display articles "articles". As illustrated in FIG. 9, only one display article having a created date of April 1 exists in the fourth file.

In Step S302, the controller 21 of the control device 20 determines whether the display articles match the configuration information on the control target device 30.

As illustrated in FIG. 9, in the display article contained in the display articles "articles", the model names "model names" of the target devices are indicated as "All", and the sales target regions "region" are indicated as "All". That is, the display article is subject to all device models, and is subject to all the sales target regions. Thus, the controller 21 determines that the display article matches the configuration information on the control target device 30, and the flow thus proceeds to Step S303.

In Step S303, the controller 21 of the control device 20 determines whether the file management tag "tag" in the display article contains the specific tag. This specific tag is stored in the storage 22 of the control device 20, and the controller 21 determines whether the description of the "tag" entry of the display article and the stored specific tag match each other. As illustrated in FIG. 8, the tag of the first display article is indicated as "Movie". This tag means that the display article is a display article containing a moving image. The tag of "Movie", which indicates that the display article generally highly probably contains data having a large size, matches the specific tag stored in the storage 22, and the flow thus proceeds to Step S304.

In Step S304, the controller 21 of the control device 20 determines whether the storage 22 stores this display article containing the moving image as cache data acquired in advance. When the storage 22 stores this display article as the cache data, the controller 21 develops the cache data (Step S307). When the storage 22 does not store this display article, the controller 21 acquires moving image data from the link destination "url" of the data (Step S305). In this embodiment, the storage 22 does not store the moving image data as the cache data, and the controller 21 thus acquires the moving image data from the link destination "url" of the data (Step S305).

As illustrated in FIG. 9, as a display language of the moving image data, any one of English, Japanese, and Germany can be selected. A selection method for the display language is the same as those described above, and detailed description thereof is thus omitted.

In this embodiment, the standard display language of the control device 20 is French, and is not contained in the selectable display languages of the display article. Thus, the controller 21 of the control device 20 selects English as the display language of the display article, and acquires the moving image data from "http://sample.com/movie1-en.mp4", which is the link destination of the stored moving image data in English illustrated in FIG. 9.

In Step S306, the controller 21 of the control device 20 stores the movie data in English as display data in the storage 22.

In Step S308, the controller 21 of the control device 20 determines whether the display articles "articles" contain another article. On this occasion, as illustrated in FIG. 9, no other article is contained in the display articles "articles". Thus, the flow illustrated in FIG. 3 is finished, and the flow proceeds to Step S209 illustrated in FIG. 2.

In Step S209, the controller 21 of the control device 20 determines whether a link destination, which is a next file, exists. As illustrated in FIG. 9, in the fourth file, "null" is indicated in the entry of the link destination "next url", which is an entry indicating a next file. That is, a next file does not exist in the fourth file, and the flow thus proceeds to Step S213.

In Step S213, the control device 20 formats the display articles stored in the storage 22 as the display data, and displays the display data on the display 24. In this embodiment, the sales target region of the control target device 30 is France, and thus the second display article in the third file subject only to devices having the United States as the sales target region is not stored as the display data in the storage 22. Therefore, as illustrated in FIG. 10, the display articles other than the second display article in the third file are displayed on the display 24 of the control device 20.

When the sales target region of the control target device 30 is the United States, the second display article in the third file is also stored in the storage 22 as the display data. Thus, as illustrated in FIG. 11, all the display articles are displayed on the display 24 of the control device 20.

When the sales target region of the control target device 30 is Japan, as illustrated in FIG. 12, as in the case in which the sales target region is France, the second display article in the third file is not displayed on the display 24 of the control device 20. Moreover, as illustrated in FIG. 5, FIG. 8, and FIG. 9, all the other display articles contain data in Japanese. Therefore, when the standard display language of the control device 20 is Japanese, and the display language for the display article is selected by referring to the standard display language of the control device 20, or when the standard display language of the control target device 30 is Japanese, and the display language for the display article is selected by referring to the standard display language of the control target device 30, as illustrated in FIG. 12, the display 24 of the control device 20 can display all the display articles in Japanese.

When, in Step S204, the acquisition date of the cache data is earlier than the update date of the first file, or when, in Step S206, the update date of the second file is earlier than the acquisition date of the cache data, the flow proceeds to Step S211. In Step S211, the controller 21 of the control device 20 develops the acquired in advance cache data from the storage 22. In Step S212, the controller 21 selects and holds the display data. Then, in Step S213, the control device 20 formats the display data, and displays the display data on the display 24.

(Second Information Processing Example)

With reference to FIG. 2, FIG. 4, and FIG. 13 to FIG. 21, description is now made of first information processing example.

FIG. 13 to FIG. 20 are schematic diagrams for illustrating files to be downloaded from the server device by the control device according to this embodiment.

Figure 21:
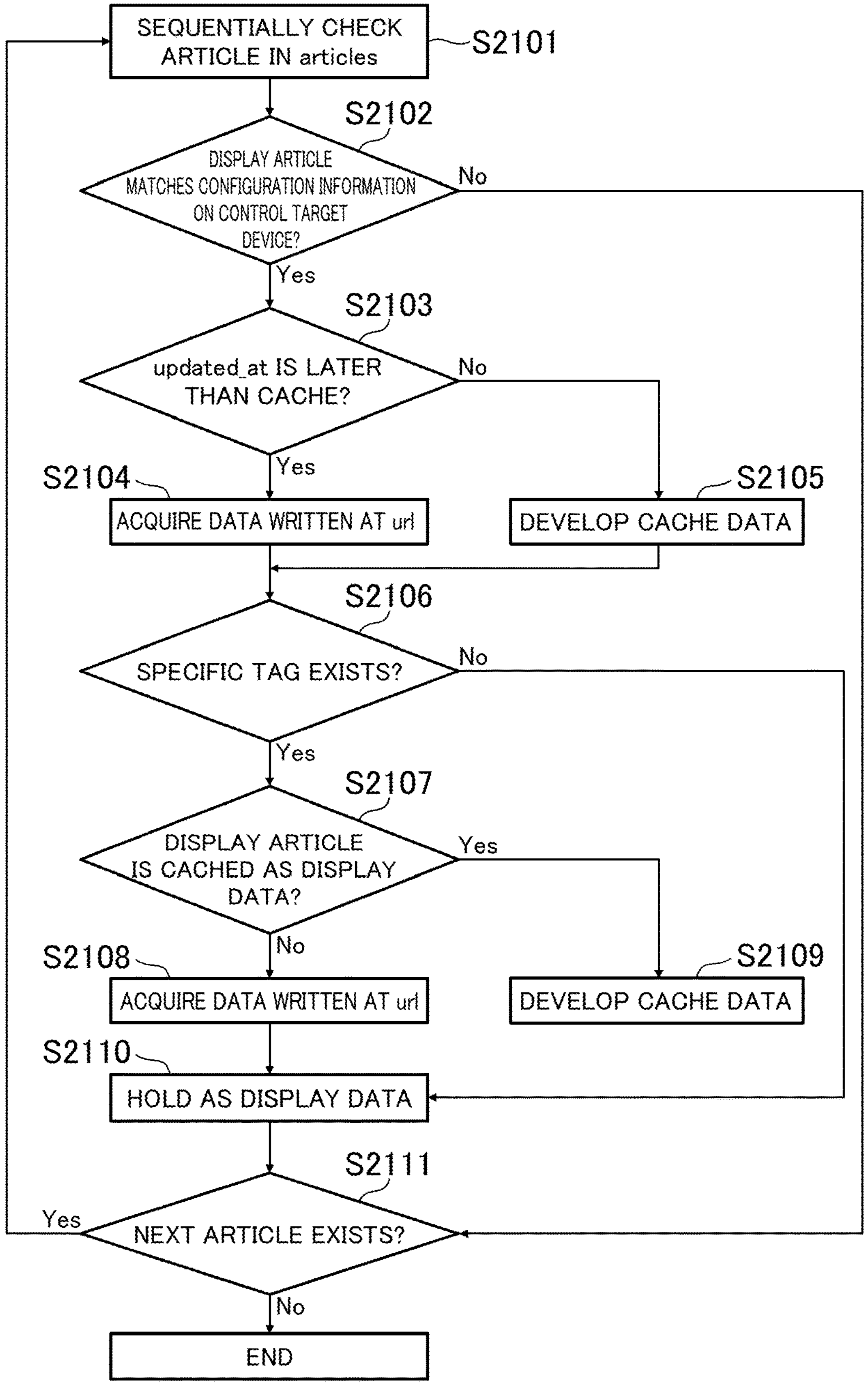
FIG. 21 is a flowchart for illustrating an example of the processing method for display data according to this embodiment.

FIG. 21 is a flowchart for illustrating an example of a processing method for display data according to this embodiment.

In Step S201, the control device 20 receives the configuration information on the control target device 30 from the control target 30. Specifically, the configuration information request signal is transmitted from the communication device 23 of the control device 20 to the control target device 30. Then, the communication device 33 of the control target device 30 receives the control information request signal through the network 1, and transmits the configuration information to the control device 20. Then, the communication device 23 of the control device 20 receives the configuration information on the control target device 30 through the network 1.

In Step S202, the controller 21 of the control device 20 reads cache data acquired in advance. On this occasion, the cache data acquired in advance by the control device 20 is, for example, the update information on the applications, and the function information, the update information on the firmware, the sales information on the related devices, and the information on starts of services provided for specific regions of the control target device 30, and the cache data is stored in the storage 22.

In Step S203, the control device 20 acquires "update.json", which is the first file, from the server device 10 through the network 1. In the first file, as illustrated in FIG. 4, the ID of the file, the update date "updated at", and the link destination of data "url" are described.

In Step S204, the controller 21 of the control device 20 compares the acquisition date of the cache data read in Step S202 and the update date of the first file acquired in Step S203 with each other. In this embodiment, the acquisition date of the cache data is March 31, and the update date of the first file is June 1 as illustrated in FIG. 4. June 1 of the update date of the first file is later than March 31 of the acquisition date of the cache data, and the flow thus proceeds to Step S205.

In Step S205, the controller 21 of the control device 20 acquires the second file "id20160601.json" from the link destination "url" described in the first file. In the second file, as illustrated in FIG. 13, an ID of the file, the update date "updated at", a link destination of the previous file "previous url", a link destination of a next file "next url", and display articles "articles" are described.

In Step S206, the control device 20 compares an acquisition date of the cache data read in Step S202 and the update date of the second file acquired in Step S205 with each other. In this embodiment, it is assumed that the acquisition date of the cache data is March 31. The update date of the second file is June 1 as indicated in the entry of "updated at" of FIG. 13, which is later than March 31, which is the acquisition date of the cache data. Therefore, the flow proceeds to Step S207.

In Step S207, the controller 21 of the control device 20 develops the acquired display articles "articles". The display articles "articles" contains a created date "created at", model names of target devices "model names", sales target regions "region", and a file management tag "tag".

The second file in this information processing example is different from the second file in the first information processing example. As illustrated in FIG. 13, each of display articles does not contain the display languages "langs", the display title "title", and the display message "message", and instead contains a link destination "article url" of each of the display articles.

In Step S208, the controller 21 of the control device 20 selects required articles from the respective display articles "articles" developed in Step S207 based on the configuration information on the control target device 30 connected to the control device 20 through the network 1, and stores the selected required articles in the storage 22 as display data. Details of Step S208 are illustrated in FIG. 21.

In Step S2101, the controller 21 of the control device 20 starts to sequentially check the respective articles in the display articles "articles" from the top.

In Step S2102, the controller 21 of the control device 20 determines whether one of the display articles "articles" matches the configuration information on the control target device 30. In this embodiment, the model of the control target device 30 is AVR-0100, and the sales target region is France.

As illustrated in FIG. 13, the display articles "articles" of the second file include a first display article having a created date of June 1, and a second display article having a created date of May 20. The controller 21 of the control device 20 first determines whether the first display article matches the configuration information on the control target device 30.

In the first display article, the model names "model names" of the target devices are indicated as "All", and the sales target regions "region" are indicated as "All". That is, the first display article is subject to all device models, and is subject to all sales target regions. Thus, the controller 21 determines that the first display article matches the configuration information on the control target device 30, and the flow proceeds to Step S2103.

In Step S2103, the controller 21 of the control device 20 compares an acquisition date of the cache data read in Step S202 and the update date of the second file acquired in Step S205 with each other. In this embodiment, it is assumed that the acquisition date of the cache data is March 31. The update date of the second file is June 1 as indicated in an entry of "updated at" of FIG. 13, which is later than March 31, which is the acquisition date of the cache data. Therefore, the flow proceeds to Step S2104.

In Step S2104, the control device 20 acquires a third file "id20160601-1.json" from the link destination "article url" described in the first display article of the second file illustrated in FIG. 13.

As illustrated in FIG. 14, the third file contains an ID of the display article "article id", the created date "created at", the model names of target devices "model names", the sales target regions "region", and the file management tag "tag" as well as display languages "langs", a display title "title", and a display message "message" of this first display article. When the control device 20 acquires the third file, the flow proceeds to Step S2106.

When the update date of the second file is earlier than the acquisition date of the cache data, the control device 20 develops the cache data (Step S2105), and then, the flow proceeds to Step S2106.

In Step S2106, the control device 20 determines whether the file management tag "tag" in the display article contains a specific tag. This specific tag is stored in the storage 22 of the control device 20, and the controller 21 determines whether the description of the "tag" entry of the display article and the stored specific tag match each other. As illustrated in FIG. 14, the tag of the first display article is indicated as "App". This tag means that the first display article is a display article relating to the application of the control device 20. The "App" tag, which means that the display article relates to the application, does not match the specific tag stored in the storage 22. Thus, the controller 21 determines that the specific tag is not contained in the first display article, and the flow proceeds to Step S2110.

In Step S2110, the control device 20 stores the first display article as display data in the storage 22. On this occasion, in the first display article, as illustrated in FIG. 14, the entry "langs" indicating the selectable display languages contains "en", "jp", and "de". That is, the first display article can be displayed in any one of English, Japanese, and German. A selection method for the display language is the same as those described in the first information processing example, and detailed description thereof is therefore omitted.

In this embodiment, the standard display language of the control device 20 is French, and is not contained in the selectable display languages of the first display article. Thus, the controller 21 of the control device 20 selects English as the display language of the display article, and stores a display title "Version 1.20" in English and a message "New functions are available." in English illustrated in FIG. 14 as the display data in the storage 22.

In Step S2111, the controller 21 of the control device 20 determines whether the display articles "articles" contain another article in the second file illustrated in FIG. 13. On this occasion, as illustrated in FIG. 13, the display articles "articles" contain the second display article having the created date of May 20, and the flow thus returns to Step S2101.

In Step S2101, the controller 21 of the control device 20 starts to check the second display article in the display articles "articles".

In Step S2102, the controller 21 of the control device 20 determines whether the second display article matches the configuration information on the control target device 30. As described above, in this embodiment, the model of the control target device 30 is AVR-0100, and the sales target region is France.

As illustrated in FIG. 13, in the second display article contained in the display articles "articles", the model names "model names" of the target devices are indicated as "AVR-XXX", and the sales target regions "region" are indicated as "us, jp, de, fr". In other words, the second display article is subject only to a series of device models having the name "AVR", and is subject only to the devices having the United States, Japan, Germany, and France as the sales target regions. In this embodiment, the model of the control target device 30 is AVR-0100, and is thus contained in the "AVR" series. Moreover, the sales target region is France, and is contained in the target regions of the second display article. Thus, the controller 21 determines that the second display article matches the configuration information on the control target device 30, and the flow proceeds to Step S2103.

In Step S2103, the controller 21 of the control device 20 compares the acquisition date of the cache data read in Step S202 and the update date of the second file acquired in Step S205 and illustrated in FIG. 13 with each other. As described above, in this embodiment, the update date of the first file, which is June 1, is later than the acquisition date of the cache data, which is March 31, and the flow thus proceeds to Step S2104.

In Step S2104, the control device 20 acquires a fourth file "id20160601-2.json" from the link destination "article url" described in the first display article of the second file illustrated in FIG. 13.

As illustrated in FIG. 15, the fourth file contains an ID of the display article "article id", the created date "created at", the model names of target devices "model names", the sales target regions "region", and the file management tag "tag" as well as display languages "langs", a display title "title", and a display message "message" of this second display article. When the control device 20 acquires the fourth file, the flow proceeds to Step S2106.

In Step S2106, the controller 21 of the control device 20 determines whether the file management tag "tag" in the display article contains the specific tag. This specific tag is stored in the storage 22 of the control device 20, and the controller 21 determines whether the description of the "tag" entry of the display article and the stored specific tag match each other. As illustrated in FIG. 15, the tag of the second display article is indicated as "Products". This tag means that the second display article is a display article relating to article information on the control device 30. This article information contains, for example, the update information on the firmware of the control target device 30, an introduction of functions of the control target device 30, the sales information on devices relating to the control target device 30, and sales information on new products. The "Products" tag, which means that the display article relates to the article information, does not match the specific tag stored in the storage 22. Thus, the controller 21 determines that the specific tag is not contained in the second display article, and the flow proceeds to Step S2110.

In Step S2110, the controller 21 of the control device 20 stores the second display article in the storage 22 as display data. On this occasion, for the second display article, as indicated in the entry "langs" of FIG. 15, three pieces of data described in selectable display languages are contained.

Respective entries "lang" of the three pieces of data indicating selectable display languages indicate "en", "jp", and "de". That is, the second display article can be displayed in any one of English, Japanese, and German. A selection method for the display language is the same as those described above, and detailed description thereof is thus omitted.

In this embodiment, the standard display language of the control device 20 is French, and is not contained in the selectable display languages of the second display article. Thus, the controller 21 of the control device 20 selects English as the display language of the second display article, and stores a display title "New Models!-AVR-XXXX" in English and a message "The new way to enjoy music." in English illustrated in FIG. 15 as the display data in the storage 22.

In Step S2111, the controller 21 of the control device 20 determines whether the display articles "articles" contain another article. On this occasion, as illustrated in FIG. 13, no other article is contained in the display articles "articles". Thus, the flow illustrated in FIG. 21 is finished, and the flow proceeds to Step S209 illustrated in FIG. 2.

In Step S209, the controller 21 of the control device 20 determines whether a link destination, which is a next file, exists. As illustrated in FIG. 13, the link destination "next url", which is an entry indicating a next file, is described in the second file, and the flow thus proceeds to Step S210.

In Step S210, the controller 21 of the control device 20 acquires a fifth file "id20160501.json" from the link destination "next url" described in the second file. In the fifth file, as illustrated in FIG. 16, an ID of the file, the update date "updated at", a link destination of the previous file "previous url", a link destination of a next file "next url", and display articles "articles" are described. On this occasion, the flow returns to Step S206.

In Step S206, the controller 21 of the control device 20 compares an acquisition date of the cache data read in Step S202 and the update date of the fifth file acquired in Step S210 with each other. In this embodiment, it is assumed that the acquisition date of the cache data is March 31. The update date of the fifth file is May 1 as indicated in an entry of "updated at" of FIG. 16, which is later than March 31, which is the acquisition date of the cache data. Therefore, the flow proceeds to Step S207.

In Step S207, the controller 21 of the control device 20 develops the acquired display articles "articles". The display articles "articles" contains a created date "created at", model names of target devices "model names", sales target regions "region", and a file management tag "tag".

As illustrated in FIG. 16, the fifth file in this information processing example does not contain the display languages "langs", the display title "title", and the display message "message" of each of the display articles, and instead contains the link destination "article url" of each of the display articles.

In Step S208, the controller 21 of the control device 20 selects required articles from the respective display articles "articles" developed in Step S207 based on the configuration information on the control target device 30 connected to the control device 20 through the network 1, and stores the selected required articles in the storage 22 as display data. Details of Step S208 are illustrated in FIG. 21.

In Step S2101, the controller 21 of the control device 20 starts to sequentially check the respective articles in the display articles "articles" from the top.

In Step S2102, the controller 21 of the control device 20 determines whether one of the display articles "articles" matches the configuration information on the control target device 30. In this embodiment, the model of the control target device 30 is AVR-0100, and the sales target region is France.

As illustrated in FIG. 16, the display articles "articles" of the fifth file include a first display article having a created date of May 1, and a second display article having a created date of April 20. The controller 21 of the control device 20 first determines whether the first display article matches the configuration information on the control target device 30.

In the first display article, the model names "model names" of the target devices are indicated as "All", and the sales target regions "region" are indicated as "All". That is, the first display article is subject to all device models, and is subject to all sales target regions. Thus, the controller 21 determines that the first display article matches the configuration information on the control target device 30, and the flow proceeds to Step S2103.

In Step S2103, the controller 21 of the control device 20 compares an acquisition date of the cache data read in Step S202 and the update date of the fifth file acquired in Step S210 with each other. In this embodiment, it is assumed that the acquisition date of the cache data is March 31. The update date of the fifth file is May 1 as illustrated in FIG. 16, which is later than March 31, which is the acquisition date of the cache data. Therefore, the flow proceeds to Step S2104.

In Step S2104, the control device 20 acquires a sixth file "id20160501-1.json" from the link destination "article url" described in the first display article of the fifth file illustrated in FIG. 16.

As illustrated in FIG. 17, the sixth file contains an ID of the display article "article id", the created date "created at", the model names of target devices "model names", the sales target regions "region", and the file management tag "tag" as well as display languages "langs", a display title "title", and a display message "message" of this first display article. When the control device 20 acquires the sixth file, the flow proceeds to Step S2106.

In Step S2106, the control device 20 determines whether the file management tag "tag" in the display article contains a specific tag. This specific tag is stored in the storage 22 of the control device 20, and the controller 21 determines whether the description of the "tag" entry of the display article and the stored specific tag match each other. As illustrated in FIG. 17, the tag of the first display article is indicated as "App". This tag means that the first display article is a display article relating to the application of the control device 20. The "App" tag, which means that the display article relates to the application, does not match the specific tag stored in the storage 22. Thus, the controller 21 determines that the specific tag is not contained in the first display article, and the flow proceeds to Step S2110.

In Step S2110, the controller 21 of the control device 20 stores the first display article as display data in the storage 22. On this occasion, the first display article contains, as indicated in the entry "langs" of FIG. 17, three pieces of data described in selectable display languages. Respective entries "lang" of the three pieces of data indicating selectable display languages indicate "en", "jp", and "de". That is, the first display article can be displayed in any one of English, Japanese, and German. A selection method for the display language is the same as those described above, and detailed description thereof is thus omitted.

In this embodiment, the standard display language of the control device 20 is French, and is not contained in the selectable display languages of the first display article. Thus, the control device 20 selects English as the display language of the display article, and stores a display title "Version 1.10" in English and a message "Bug fixes." in English illustrated in FIG. 17 as the display data in the storage 22.

In Step S2111, the controller 21 of the control device 20 determines whether the display articles "articles" contain another article in the fifth file illustrated in FIG. 16. On this occasion, as illustrated in FIG. 16, the display articles "articles" contain the second display article having the created date of April 20, and the flow thus returns to Step S2101.

In Step S2101, the controller 21 of the control device 20 checks the second display article in the display articles "articles".

In Step S2102, the controller 21 of the control device 20 determines whether the second display article matches the configuration information on the control target device 30. As described above, in this embodiment, the model of the control target device 30 is AVR-0100, and the sales target region is France.

As illustrated in FIG. 18, in the second display article contained in the display articles "articles", the model names "model names" of the target devices are indicated as "All", and the sales target regions "region" are indicated as "us". That is, the second display article is subject to all device models, and is subject only to devices having the United States as the sales target region. In this embodiment, the sales target region of the control target device 30 is France, and is not contained in the target region of the second display article. Thus, the controller 21 determines that the second display article does not match the configuration information on the control target device 30, and the control device 20 does not store the second display article as the display data in the storage 22. The flow then proceeds to Step S2111.

In Step S2111, the controller 21 of the control device 20 determines whether the display articles "articles" contain another article. On this occasion, as illustrated in FIG. 16, no other article is contained in the display articles "articles". Thus, the flow illustrated in FIG. 21 is finished, and the flow proceeds to Step S209 illustrated in FIG. 2.

In Step S209, the controller 21 of the control device 20 determines whether a link destination, which is an entry indicating a next file, exists. As illustrated in FIG. 16, the link destination "next url", which is a next file, is described in the fifth file, and the flow thus proceeds to Step S210.

In Step S210, the control device 20 acquires an eighth file "id20160401.json" from the link destination "next url" described in the fifth file. In the eighth file, as illustrated in FIG. 19, an ID of the file, the update date "updated at", a link destination of the previous file "previous url", a link destination of a next file "next url", and display articles "articles" are described. On this occasion, the flow returns to Step S206.

In Step S206, the controller 21 of the control device 20 compares an acquisition date of the cache data read in Step S202 and the update date of the eighth file acquired in Step S210 with each other. In this embodiment, it is assumed that the acquisition date of the cache data is March 31. The update date of the eighth file is April 1 as indicated in an entry of "updated at" of FIG. 19, which is later than March 31, which is the acquisition date of the cache data. Therefore, the flow proceeds to Step S207.

In Step S207, the controller 21 of the control device 20 develops the acquired display articles "articles". The display articles "articles" contains a created date "created at", model names of target devices "model names", sales target regions "region", and a file management tag "tag".

As illustrated in FIG. 19, in the eighth file in this information processing example, each of the display articles does not contain the display languages "langs", the display title "title", and the display message "message", and instead contains a link destination "article url" of each of the display articles.

In Step S208, the controller 21 of the control device 20 selects required articles from the respective display articles "articles" developed in Step S207 based on the configuration information on the control target device 30 connected to the control device 20 through the network 1, and stores the selected required articles in the storage 22 as display data. Details of Step S208 are illustrated in FIG. 21.

In Step S2101, the controller 21 of the control device 20 starts to check the display articles in the display articles "articles". As illustrated in FIG. 19, only one display article having a created date of April 1 exists in the eighth file.

In Step S2102, the controller 21 of the control device 20 determines whether the display articles match the configuration information on the control target device 30.

As illustrated in FIG. 19, in the display article contained in the display articles "articles", the model names "model names" of the target devices are indicated as "All", and the sales target regions "region" are indicated as "All". That is, the display article is subject to all device models, and is subject to all the sales target regions. Thus, the controller 21 determines that the display article matches the configuration information on the control target device 30, and the flow proceeds to Step S2103.

In Step S2103, the controller 21 of the control device 20 compares an acquisition date of the cache data read in Step S202 and the update date of the eighth file acquired in Step S210 with each other. In this embodiment, it is assumed that the acquisition date of the cache data is March 31. The update date of the eighth file is April 1 as indicated in an entry of "updated at" of FIG. 19, which is later than March 31, which is the acquisition date of the cache data. Therefore, the flow proceeds to Step S2104.

In Step S2104, the control device 20 acquires a ninth file "id20160401-1.json" from the link destination "article url" described in the eighth file illustrated in FIG. 19.

As illustrated in FIG. 20, the ninth file contains an ID of the display article "article id", the created date "created at", the model names of target devices "model names", the sales target regions "region", and the file management tag "tag" as well as display languages "langs", a display title "title", and a display message "message" of this display article. When the control device 20 acquires the ninth file, the flow proceeds to Step S2106.

In Step S2106, the controller 21 of the control device 20 determines whether the file management tag "tag" in the display article contains the specific tag. This specific tag is stored in the storage 22 of the control device 20, and the controller 21 determines whether the description of the "tag" entry of the display article and the stored specific tag match each other. As illustrated in FIG. 20, the tag of the first display article is indicated as "Movie". This tag means that the display article is a display article containing a moving image. The controller 21 determines that the tag of "Movie", which indicates that the display article generally highly probably contains data having a large size, matches the specific tag stored in the storage 22, and the flow thus proceeds to Step S2107.

In Step S2107, the controller 21 of the control device 20 determines whether the storage 22 stores this display article containing the moving image as cache data acquired in advance. When the storage 22 stores this display article as the cache data, the controller 21 develops the cache data (Step S2109). When the storage 22 does not store this display article, the controller 21 acquires moving image data from the link destination "url" of the data (Step S2108). In this embodiment, the storage 22 does not store the moving image data as the cache data, and the controller 21 thus acquires the moving image data from the link destination "url" of the data (Step S2108).

As illustrated in FIG. 20, as a display language of the moving image data, any one of English, Japanese, and Germany can be selected. A selection method for the display language is the same as those described above, and detailed description thereof is thus omitted.

In this embodiment, the standard display language of the control device 20 is French, and is not contained in the selectable display languages of the display article. Thus, the controller 21 of the control device 20 selects English as the display language of the display article, and acquires the moving image data from "http://sample.com/movie1-en.mp4", which is the link destination of the stored moving image data in English illustrated in FIG. 9.

In Step S2110, the controller 21 of the control device 20 stores the moving image data as display data in the storage 22.

In Step S2111, the controller 21 of the control device 20 determines whether the display articles "articles" contain another article. On this occasion, as illustrated in FIG. 19, no other article is contained in the display articles "articles". Thus, the flow illustrated in FIG. 21 is finished, and the flow proceeds to Step S209 illustrated in FIG. 2.

In Step S209, the controller 21 of the control device 20 determines whether a link destination, which is an entry indicating a next file, exists. As illustrated in FIG. 19, "null" is indicated in the entry of the link destination "next url" in the eighth file. That is, a next file does not exist in the eighth file, and the flow thus proceeds to Step S213.

In Step S213, the control device 20 formats the display articles stored in the storage 22 as the display data, and displays the display data on the display 24. In this embodiment, the sales target region of the control target device 30 is France, and thus only the display article in the seventh file subject only to devices having the United States as the sales target region is not stored as the display data in the storage 22. Therefore, as illustrated in FIG. 10, the display articles other than the display article in the seventh file are displayed on the display 24 of the control device 20.

When the sales target region of the control target device 30 is the United States, the display article in the seventh file is also stored in the storage 22 as the display data. Thus, as illustrated in FIG. 11, all the display articles are displayed on the display 24 of the control device 20.

When the sales target region of the control target device 30 is Japan, as illustrated in FIG. 12, as in the case in which the sales target region is France, the display article in the seventh file is not displayed on the display 24 of the control device 20. Moreover, all the other display articles contain data in Japanese. Therefore, when the standard display language of the control device 20 is Japanese, and the display language for the display article is selected by referring to the standard display language of the control device 20, or when the standard display language of the control target device 30 is Japanese, and the display language for the display article is selected by referring to the standard display language of the control target device 30, as illustrated in FIG. 12, the display 24 of the control device 20 can display all the respective display articles in Japanese.

When, in Step S204, the acquisition date of the cache data is earlier than the update date of the first file, or when, in Step S206, the update date of the second file is earlier than the acquisition date of the cache data, the flow proceeds to Step S211. In Step S211, the controller 21 of the control device 20 develops the acquired in advance cache data from the storage 22. In Step S212, the controller 21 selects and holds the display data. Then, in Step S213, the control device 20 formats the display data, and displays the display data on the display 24.

Figure 22:
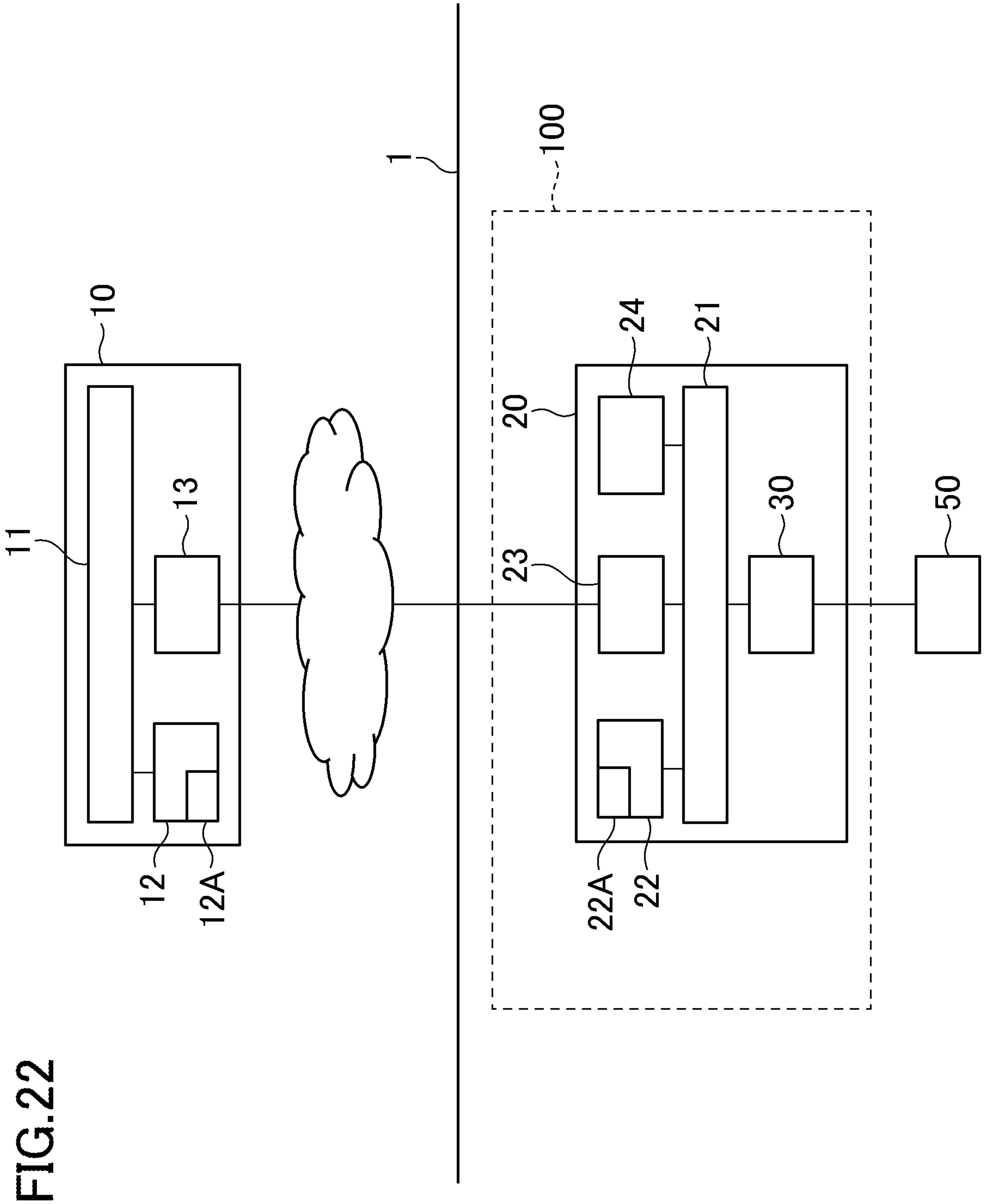
FIG. 22 is a schematic diagram for illustrating another example of the control device and the control target device according to this embodiment.

In this embodiment, the control device 20 and the control target device 30 in the control system 100 exist independently of each other as illustrated in FIG. 1, but the control device 20 and the control target device 30 may integrally form the control system 100. Specifically, as illustrated in FIG. 22, the control target device 30 may be integrated into the control device 20, and the controller 21, the storage 22, and the communication device 23 of the control device 20 may be configured to function as a controller, a storage, and a communication device of the entire control system 100. In such a case, the configuration information on the control target device 30 is stored in the storage 22, and the controller 21 acquires the configuration information on the control target device 30 from the storage 22.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A control device, comprising:

a communication device configured to receive, from a control target device connected to the control device through a network, configuration information on a configuration of software and/or hardware of the control target device;

a controller configured to acquire a display article from a server device connected to the control device through the network, and determine whether to store the display article in a storage as display data, based on the configuration information; and a controller configured to acquire a first file from a server device connected to the control device through the network, and acquire a second file from a link destination described in the first file, and determine whether to store a first display article of the second file in a storage as display data based on the configuration information, and acquire a third file, whose update date is older than the update date of the first file and the second file, from a link destination described in the second file, and determine whether to store a second display article of the third file in the storage as display data based on the configuration information; and the storage configured to store the display data based on the determination by the controller.

2. The control device according to claim 1, wherein the display article is separated and contained in a plurality of files, and wherein the controller is configured to determine whether a file acquired from the server device contains a specific tag meaning that the display article contains a specific type of data, and determine, when the controller determines that the display article contains the specific tag, whether to acquire the specific type of data from a link destination described in the file containing the specific tag.

3. The control device according to claim 2, wherein the display article is separated and contained in a plurality of files, and wherein the first file has a latest update date out of the plurality of files from the server device, and the second file has a same update date as the update date of the first file or has a next latest update date from a link destination described in the first file.

4. The control device according to claim 3, wherein the display article contains information on a model name of a control target device to be controlled by the control device, and wherein the controller is configured to determine whether the information on the model name and the configuration information match each other.

5. The control device according to claim 4, wherein when the information on the model name and the configuration information match each other, the controller stores the display article in the storage as the display data.

6. The control device according to claim 1, wherein the display article contains information on a sales target region of a control target device to be controlled by the control device, and wherein the controller is configured to determine whether the information on the sales target region and the configuration information match each other.

7. The control device according to claim 6, wherein when the information on the sales target region and the configuration information match each other, the controller stores the display article in the storage as the display data.

8. The method according to claim 6, further comprising:

in response to the information on the sales target region and the configuration information matching each other, storing the first or the second display article in the storage as the display data.

9. The control device according to claim 1, wherein the display article contains plurality of pieces of data described in selectable display languages, and wherein the controller is configured to select, out of the plurality of pieces of data, one piece of data to be stored in the storage as the display data.

10. The control device according to claim 1, further comprising a display configured to display the display data stored in the storage.

11. The control device according to claim 1, wherein the communication device is configured to transmit a configuration information request signal to the control target device connected to the control device through the network.

12. A processing method for display data, the method comprising:

receiving, from a control target device connected through a network, configuration information on a configuration of software and/or hardware of the control target device;

acquiring a first file from a server device connected through the network;

acquiring a second file from a link destination described in the first file;

determining whether to store a first display article of the second file in a storage as display data based on configuration information;

acquiring a third file, whose update date is older than the update date of the first file and the second file, from a link destination described in the second file;

determining whether to store a second display article of the first file in the storage as display data based on the configuration information, and storing the display data based on the determination.

13. The method according to claim 12, wherein the first or the second display article is separated and contained in a plurality of files, and the method further comprises:

determining whether a file acquired from the server device contains a specific tag meaning that the first or the second display article contains a specific type of data, and determining, when it is determined that the first or the second display article contains the specific tag, whether to acquire the specific type of data from a link destination described in the file containing the specific tag.

14. The method according to claim 13, wherein the first or the second display article is separated and contained in a plurality of files, and the first file has a latest update date out of the plurality of files from the server device, and the second file has a same update date as the update date of the first file or has a next latest update date from a link destination described in the first file.

15. The method according to claim 14, wherein the first or the second display article contains information on a model name of a control target device to be controlled and the method further comprises:

determining whether the information on the model name and the configuration information match each other.

16. The method according to claim 15, further comprising:

in response to the information on the model name and the configuration information match each other, storing the first or the second display article in the storage as the display data.

17. The method according to claim 12, wherein the first or the second display article contains information on a sales target region of a control target device to be controlled, and the method further comprises:

determining whether the information on the sales target region and the configuration information match each other.

18. The method according to claim 12, wherein the first or the second display article contains plurality of pieces of data described in selectable display languages, and the method further comprises:

selecting, out of the plurality of pieces of data, one piece of data to be stored in the storage as the display data.

19. The method according to claim 12, further comprising:

displaying the data stored in the storage.

20. The method according to claim 12, further comprising:

transmitting a configuration information request signal to the control target device connected through the network.

* * * * *